United States Patent
Pitsch et al.

(10) Patent No.: US 11,092,209 B2
(45) Date of Patent: Aug. 17, 2021

(54) VIBRATION DAMPER FOR VEHICLES, A PISTON ROD AND A METHOD FOR FIXING A WORKING PISTON ON A PISTON ROD OF A VIBRATION DAMPER

(71) Applicants: ThyssenKrupp Bilstein GmbH, Ennepetal (DE); thyssenkrupp AG, Essen (DE)

(72) Inventors: Daniel Pitsch, Cologne (DE); Martin Flick, Gummersbach (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/107,304

(22) Filed: Aug. 21, 2018

(65) Prior Publication Data
US 2019/0063539 A1    Feb. 28, 2019

(30) Foreign Application Priority Data

Aug. 25, 2017 (DE) .................... 10 2017 214 922.1
Aug. 25, 2017 (DE) .................... 10 2017 214 924.8

(51) Int. Cl.
*F16F 9/32*    (2006.01)
*F16F 9/10*    (2006.01)
*F16F 9/19*    (2006.01)

(52) U.S. Cl.
CPC ............... *F16F 9/103* (2013.01); *F16F 9/19* (2013.01); *F16F 9/3228* (2013.01);
(Continued)

(58) Field of Classification Search
CPC ............... F16F 9/3228; F01L 3/10; F16J 1/12
(Continued)

(56) References Cited

U.S. PATENT DOCUMENTS 1,307,502 A    6/1919   Knudson
3,670,630 A    6/1972   Tyson
(Continued)

FOREIGN PATENT DOCUMENTS

CN    1083902 A     3/1994
CN    101029668 A   9/2007
(Continued)

OTHER PUBLICATIONS

Machine translation of DE 10 2005 058 555 B3, retrieved Oct. 24, 2019 (Year: 2019).*

*Primary Examiner* — Bradley T King
(74) *Attorney, Agent, or Firm* — thyssenkrupp North America, LLC

(57) ABSTRACT

A vibration damper may include a damper tube filled at least partially with damping liquid. A piston rod is movable to and fro in the damper tube. A working piston is movable with the piston rod by way of which working piston an interior space of the damper tube is divided into two spaces. The vibration damper may have a wedge element and a bracing element, and the piston rod may have a wedge element recess for partially receiving the wedge element. The wedge element may be arranged in the at least one wedge element recess in a braced state, and the at least one bracing element may be connected to the working piston such that the bracing element braces the working piston with respect to the piston rod via the wedge element arranged in the element recess.

10 Claims, 1 Drawing Sheet

(52) U.S. Cl.
CPC ........ *F16F 9/3235* (2013.01); *F16F 2222/12* (2013.01); *F16F 2226/04* (2013.01); *F16F 2232/08* (2013.01)

(58) Field of Classification Search
USPC ..................................... 403/367, 368, 374.1
See application file for complete search history.

(56) References Cited

U.S. PATENT DOCUMENTS

| | | | | |
|---|---|---|---|---|
| 3,807,285 | A | * | 4/1974 | Phillips ..................... F16J 1/12 |
| | | | | 92/255 |
| 4,431,092 | A | | 2/1984 | Kloster |
| 4,438,908 | A | | 3/1984 | Terada |
| 4,791,712 | A | * | 12/1988 | Wells ..................... B21D 39/04 |
| | | | | 188/322.22 |
| 4,815,360 | A | | 3/1989 | Winterle |
| 4,958,706 | A | | 9/1990 | Richardson |
| 5,213,072 | A | * | 5/1993 | Dohring .................. F01L 1/143 |
| | | | | 123/90.37 |
| 5,515,821 | A | * | 5/1996 | Wolck, Jr. ................. F01L 1/46 |
| | | | | 123/188.6 |
| 5,730,262 | A | | 3/1998 | Rucks |
| 2008/0296402 | A1 | * | 12/2008 | Grant .................... F02M 59/102 |
| | | | | 239/89 |
| 2011/0290605 | A1 | * | 12/2011 | Krawczyk ............. F16F 9/3228 |
| | | | | 188/322.22 |
| 2019/0063540 | A1 | * | 2/2019 | Pitsch ....................... F16F 9/19 |

FOREIGN PATENT DOCUMENTS

| | | | | |
|---|---|---|---|---|
| CN | 204344794 | U | | 5/2015 |
| CN | 105822712 | A | | 8/2016 |
| DE | 1004436 | B | | 3/1957 |
| DE | 10138322 | A | | 3/2003 |
| DE | 102005058555 | B3 | * | 6/2007 ........... F16F 9/3228 |
| EP | 1 283 387 | A | | 2/2003 |
| JP | S5715136 | A | | 1/1982 |

* cited by examiner

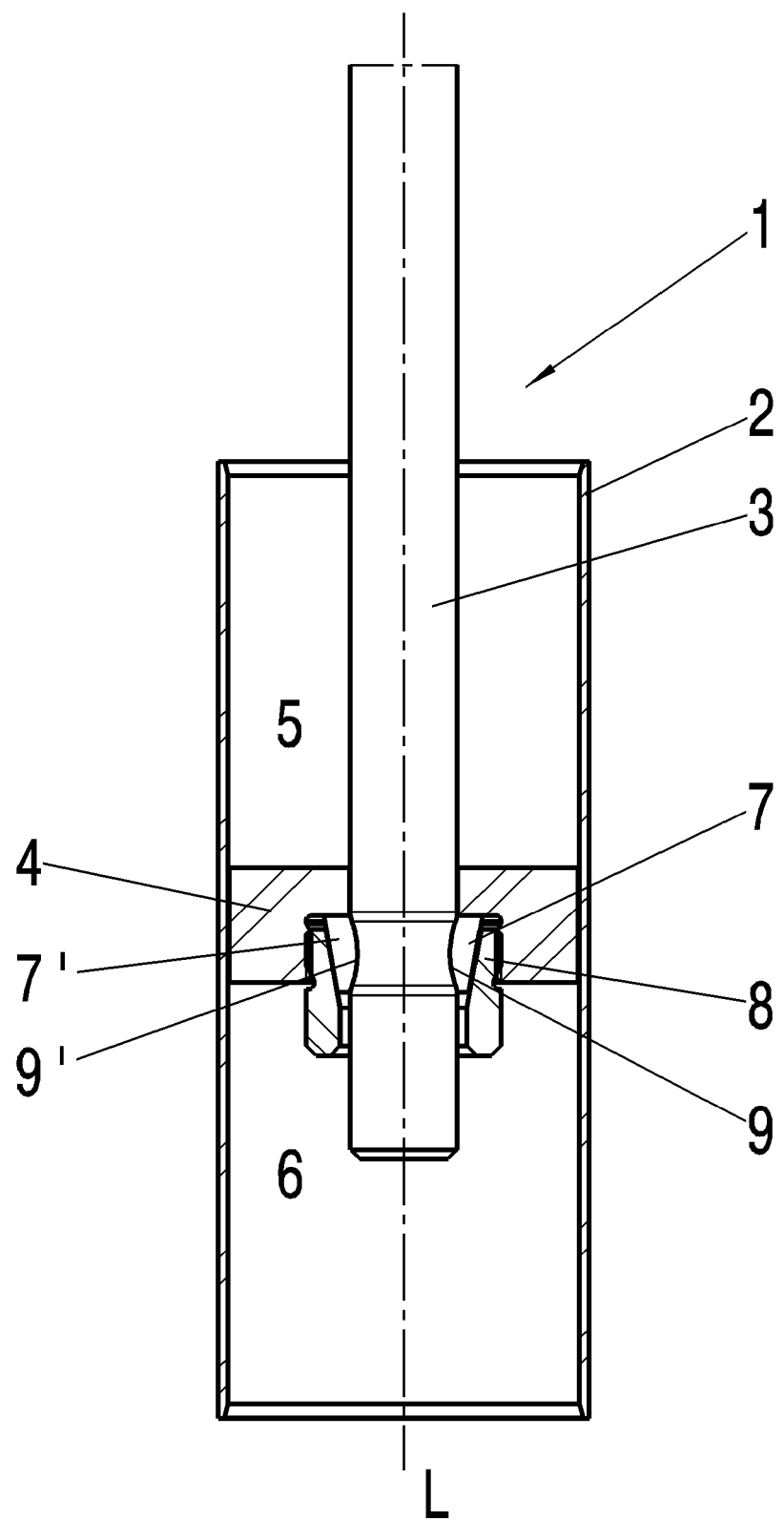

VIBRATION DAMPER FOR VEHICLES, A PISTON ROD AND A METHOD FOR FIXING A WORKING PISTON ON A PISTON ROD OF A VIBRATION DAMPER

CROSS-REFERENCE TO RELATED APPLICATIONS

This application is a non-provisional application claiming priority to German Patent Application No. DE 10 2017 214 922.1, which was filed Aug. 25, 2017 and German Patent Application No. DE 10 2017 214 924.8, which was filed Aug. 25, 2017, the entire contents of both of which are hereby incorporated by reference herein.

FIELD

The present disclosure generally relates to vibration dampers for vehicles, piston rods, and methods for fixing working pistons on piston rods of vibration dampers.

BACKGROUND

Vibration dampers are known in various forms in the prior art.

German Patent No. DE 101 38 322 A1 discloses a vibration damper having a working piston that is attached to a piston rod via a threaded connection.

It is a problem in the case of the embodiments which are known in the prior art that weight and material savings on the piston rod component and the working piston attachment thereof are not possible or are only possible to a very limited extent on account of the required strength and continuous loading properties. In particular, high component weights are associated with lower vibration damper performance and higher costs, such as material and/or machining costs.

Thus a need exists for an improved vibration damper and a piston rod, in the case of which the above-mentioned disadvantages are avoided. In particular, an improved piston rod is needed by way of the said improved vibration damper, which improved piston rod arrangement, in the case of identical or improved strength and continuous loading properties, makes an attachment possible which is secure and as stress-free as possible to a working piston in the case of identical or lower component weights and improved damper performance. Furthermore, a simple, more secure method with reduced errors for fixing a working piston on a piston rod of a vibration damper is needed. In addition, a method with low manufacturing costs is needed.

BRIEF DESCRIPTION OF THE FIGURE

FIG. 1 is a longitudinal sectional diagram of an example vibration damper in a braced state in a region of an example working piston.

DETAILED DESCRIPTION

Although certain example methods and apparatuses have been described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some respects, the present disclosure concerns a vibration damper for vehicles, comprising a damper tube which is filled at least partially with damping liquid, it being possible for a piston rod to be moved to and fro in the damper tube, it being possible for a working piston to also be moved with the piston rod, by way of which working piston the interior space of the damper tube is divided into a piston rod-side working space and a working space which is remote from the piston rod, the vibration damper having at least one wedge element and at least one bracing element, and the piston rod having at least one wedge element recess for partially receiving the at least one wedge element, the at least one wedge element being arranged in the at least one wedge element recess in a braced state, and the at least one bracing element being connected to the working piston in such a way that the at least one bracing element braces the working piston with respect to the piston rod via the at least one wedge element which is arranged in the at least one wedge element recess.

The present disclosure further generally concerns a piston rod for a vibration damper. The piston rod may have at least one wedge element recess for partially receiving the at least one wedge element.

Still further, the present disclosure also generally concerns a method for fixing a working piston on a piston rod of a vibration damper, in some cases for vehicles, comprising the steps:

a. provision of at least one wedge element,
b. provision of at least one bracing element,
c. provision of a piston rod, the piston rod having at least one wedge element recess for partially receiving the at least one wedge element which is provided in step a),
d. provision of a working piston, the working piston having at least one passage opening for guiding through the piston rod which is provided in step c),
e. introduction of the piston rod which is provided in step c) through the passage opening of the working piston which is provided in step d), and arrangement of the working piston on a side of the at least one wedge element recess of the introduced piston rod which is axial to the piston rod, the working piston being arranged in such a way that the working piston does not cover the wedge element recess,
f. arrangement of the at least one wedge element which is provided in step a) in the at least one wedge element recess of the piston rod which is introduced in step e),
g. arrangement of the at least one bracing element which is provided in step b) on the other side of the at least one wedge element recess of the piston rod which is introduced in step e), which side is axial to the piston rod, and
h. bracing of the bracing element which is arranged in step g) by way of the working piston which is arranged in step e) with respect to the piston rod which is introduced in step e), via the at least one wedge element which is arranged in step f) in the at least one wedge element recess of the piston rod which is introduced in step e).

The present disclosure can be implemented in a vibration damper, in a piston rod, and in a method for fixing a working piston on a piston rod of a vibration damper.

In comparison with conventional vibration dampers, the vibration damper according to the disclosure has the advantage of lower component weights, in particular of the piston rod weight in the case of identical or improved strength and continuous loading properties. In addition, a secure attachment which is as free from stress as possible to a working piston is made possible in the case of identical or lower component weights. Furthermore, in the case of overloading of the piston rod according to the disclosure, the latter is more inclined to bend than to break. In addition, there exists the possibility to increase the size of the working piston area for the same or reduced external dimensions of the vibration damper. Furthermore, a reduced piston rod diameter of the piston rod according to the disclosure is associated with less friction on account of a smaller contact area. In addition, the manufacturing costs of the piston rods are lower.

In comparison with conventional piston rods, the piston rod according to the disclosure has the advantage of a lower piston rod weight in the case of identical or improved strength and continuous loading properties. Furthermore, the manufacturing costs of the piston rods are lower.

The method according to the disclosure for fixing a working piston on a piston rod of a vibration damper, in particular for vehicles, has the advantage of a simple, more secure method with reduced errors in comparison with conventional methods.

Within the context of the present disclosure, braced is understood to mean an at least non-positive connection which is, in particular, fastening of a working piston to a piston rod, which fastening can be released again and/or is adjustable. The connection is by way of example also embodied as a positive connection.

In a further example, the at least one wedge element recess for receiving the at least one wedge element configures a fit in the braced state with the at least one wedge element.

Within the context of the present disclosure, a fit is understood to at least mean a transition fit, in particular an interference fit. For example, two wedge elements are used.

In accordance with another example, the at least one wedge element recess for receiving the at least one wedge element and that side of the at least one wedge element which is to be received in the at least one wedge element recess have at least one geometrically concave shape.

In accordance with another example of the present disclosure, on the side which faces the piston rod, the at least one wedge element has at least one geometrically convex shape for receiving in the at least one concave shape of the wedge element recess.

In further examples of the disclosure, the at least one wedge element is configured as a geometric hollow cone shaped segment and the at least one bracing element is configured as a geometric funnel shape, the geometric hollow cone shaped segment of the at least one wedge element being arranged in the geometric funnel shape of the bracing element in the braced state and being configured as a clamping fit.

In accordance with still other examples, the at least one wedge element is selected from a group comprising a collet, a wedge, a clamping bush, a clamping jaw, a chuck, a clamping sleeve, a half shell or a combination thereof.

In some examples, the at least one bracing element is selected from a group comprising a collet nut, a threaded nut, in particular an external threaded nut, a shim with a thread, in particular a shim with an external thread, a counter washer, a jam nut, a lock nut or a combination thereof.

In another example, the sequence of steps a) to d) is arbitrary.

FIG. 1 is a longitudinal section along a longitudinal axis L (illustrated using dashes) of a vibration damper 1 in the region of a working piston 4 with a damper tube 2, a piston rod 3 and the working piston 4 which is arranged on the piston rod 3, in accordance with some examples. The working piston 4 divides the interior space of the damper tube 2 into a piston rod-side working space 5 and a working space 6 which is remote from the piston rod. The piston rod 3 has at least one wedge element recess (shown as two wedge element recesses 9, 9') for partially receiving at least one wedge element (shown as two wedge elements 7, 7'). In the braced state which is shown, the wedge elements 7, 7' are arranged in the wedge element recesses 9, 9', and the at least one bracing element 8 is connected to the working piston 4 in such a way that the at least one bracing element 8 braces the working piston 4 with respect to the piston rod 3 via the wedge elements 7, 7' which are arranged in the wedge element recesses 9, 9'. In the example shown, for bracing purposes, the bracing element 8 which has an external thread is screwed into an internal thread which matches the external thread and is arranged within the working piston 4, the working piston 4 being braced more fixedly with respect to the piston rod 3 as the screwing action increases, via the wedge action between the geometrical funnel shape which is shown of the bracing element and the wedge elements 7, 7' which are arranged in the wedge element recesses 9, 9'.

Vibration dampers, piston rods, and methods for fixing a working piston on a piston rod of a vibration damper of the above-described type are used in the production of vehicles, in particular of chassis of motor vehicles, of motorcycles, of bicycles, of snowmobiles, and of electric vehicles.

LIST OF REFERENCE SIGNS

1=Vibration damper
2=Damper tube
3=Piston rod
4=Working piston
5=Piston rod-side working space
6=Working space which is remote from the piston rod
7, 7'=Wedge element/elements
8=Bracing element/elements
9, 9'=Wedge element recess
L=Longitudinal axis of the vibration damper

What is claimed is:

1. A vibration damper for a vehicle, the vibration damper comprising:
    a damper tube that is filled at least partially with damping liquid, wherein a piston rod that extends along a longitudinal axis is movable to and fro in the damper tube, wherein a working piston is movable with the piston rod, by way of which working piston an interior space of the damper tube is divided into a piston rod-side working space and a working space that is distal the piston rod;
    a wedge element, wherein the piston rod includes a wedge element recess for partially receiving the wedge element, wherein along a majority of a longitudinal length of the wedge element an outer diameter of the wedge element increases with increased proximity to the piston rod-side working space, wherein the wedge element protrudes longitudinally beyond the working piston; and a bracing element connected to the working piston such that the bracing element braces the working piston with respect to the piston rod via the wedge element, which is disposed in the wedge element recess in a braced state, wherein the working piston is disposed at a location along the longitudinal axis where the wedge element engages the bracing element such that a degree of longitudinal engagement between the wedge element and the bracing element is proportional to an outward force that the bracing element exerts on the working piston.

2. The vibration damper of claim 1 wherein a geometrically convex shape of the wedge element mates with a geometrically concave shape of the wedge element recess independent of the degree of longitudinal engagement between the wedge element and the bracing element.

3. The vibration damper of claim 1 wherein the bracing element is spaced apart from the piston rod such that no part of the bracing element is in direct contact with the piston rod.

4. The vibration damper of claim 1 wherein the wedge element and the bracing element both have a wedge shape with a thin longitudinal end and a blunt longitudinal end.

5. The vibration damper of claim 4 wherein the thin longitudinal end of the bracing element corresponds to a radially-thinnest portion of the bracing element.

6. A vibration damper for a vehicle, the vibration damper comprising:
a damper tube that is filled at least partially with damping liquid, wherein a piston rod that extends along a longitudinal axis is movable to and fro in the damper tube, wherein a working piston is movable with the piston rod, by way of which working piston an interior space of the damper tube is divided into a piston rod-side working space and a working space that is distal the piston rod;
a wedge element, wherein the piston rod includes a wedge element recess for partially receiving the wedge element, wherein the wedge element protrudes longitudinally beyond the working piston; and
a bracing element connected to the working piston such that the bracing element braces the working piston with respect to the piston rod via the wedge element, which is disposed in the wedge element recess in a braced state, wherein the working piston is disposed at a location along the longitudinal axis where the wedge element engages the bracing element such that a degree of longitudinal engagement between the wedge element and the bracing element is proportional to an outward force that the bracing element exerts on the working piston in a radial direction that is perpendicular to the longitudinal axis, wherein a longitudinal midpoint of the bracing element overlaps the wedge element in the radial direction and a longitudinal midpoint of the wedge element overlaps the bracing element in the radial direction.

7. The vibration damper of claim 6 wherein a geometrically convex shape of the wedge element mates with a geometrically concave shape of the wedge element recess independent of the degree of longitudinal engagement between the wedge element and the bracing element.

8. The vibration damper of claim 6 wherein the bracing element is spaced apart from the piston rod such that no part of the bracing element is in direct contact with the piston rod.

9. The vibration damper of claim 6 wherein the wedge element and the bracing element both have a wedge shape with a thin longitudinal end and a blunt longitudinal end.

10. The vibration damper of claim 9 wherein the thin longitudinal end of the bracing element corresponds to a radially-thinnest portion of the bracing element, with the thin longitudinal end of the bracing element being disposed proximate the blunt longitudinal end of the wedge element.

\* \* \* \* \*